(12) United States Patent
Bhat et al.

(10) Patent No.: US 8,713,550 B2
(45) Date of Patent: Apr. 29, 2014

(54) METHODS, DEVICES AND SOFTWARE APPLICATIONS FOR FACILITATING A DEVELOPMENT OF A COMPUTER PROGRAM

(75) Inventors: Anand Gajanan Bhat, Karnataka (IN); Manish Makkar, Uttar Pradesh (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1566 days.

(21) Appl. No.: 11/885,784

(22) PCT Filed: Mar. 11, 2005

(86) PCT No.: PCT/IN2005/000080
§ 371 (c)(1),
(2), (4) Date: Sep. 6, 2007

(87) PCT Pub. No.: WO2006/095358
PCT Pub. Date: Sep. 14, 2006

(65) Prior Publication Data
US 2009/0265697 A1    Oct. 22, 2009

(51) Int. Cl.
*G06F 9/44* (2006.01)

(52) U.S. Cl.
USPC ............ 717/163; 717/107; 717/170; 719/331

(58) Field of Classification Search
USPC .......................................................... 717/163
See application file for complete search history.

(56) References Cited

U.S. PATENT DOCUMENTS

| | | | |
|---|---|---|---|
| 5,805,899 A | 9/1998 | Evans et al. | |
| 6,202,205 B1 * | 3/2001 | Saboff et al. | 717/151 |
| 6,377,960 B1 * | 4/2002 | Qiu et al. | 1/1 |
| 6,658,659 B2 | 12/2003 | Hiller et al. | |
| 6,948,059 B1 * | 9/2005 | Sprecher et al. | 713/100 |
| 7,065,754 B1 * | 6/2006 | Coutant et al. | 717/146 |
| 7,159,222 B1 * | 1/2007 | Forin et al. | 719/310 |
| 2001/0039650 A1 | 11/2001 | Bodo | |
| 2002/0133804 A1 | 9/2002 | Sheedy | |
| 2004/0044999 A1 * | 3/2004 | Gibson | 717/178 |
| 2005/0039196 A1 * | 2/2005 | Sasidharan | 719/331 |
| 2007/0256087 A1 * | 11/2007 | Forin et al. | 719/332 |

OTHER PUBLICATIONS

Seeback, "Dissecting shared libraries" Jan. 11, 2005, IBM developerWorks, accessed Feb. 7, 2013 at <http://www.ibm.com/developerworks/linux/library/l-shlibs/index.html>.*

* cited by examiner

*Primary Examiner* — James D Rutten

(57) ABSTRACT

A software development application determines whether routine name and version number parameters have been identified (33). If so, the application determines whether the specified version of the routine can be accessed (35). If the specified version cannot be accessed, the application locates a substitute version of the routine (37) and compiles and links the routines and a source file to produce an executable file (39).

10 Claims, 4 Drawing Sheets

METHODS, DEVICES AND SOFTWARE APPLICATIONS FOR FACILITATING A DEVELOPMENT OF A COMPUTER PROGRAM

FIELD OF THE INVENTION

The present invention relates generally to methods, devices and software applications for facilitating a development of a computer program, and has particular—but by no means exclusive—application to providing source level compatibility for the computer program.

BACKGROUND OF THE INVENTION

Software compatibility is an important aspect of the software industry. Software compatibility essentially relates to the ability of software to be used in different environments such as those provided under dissimilar operating systems. Software compatibility can be broadly divided into two categories. The first category deals with source level compatibility, which relates to allowing source code to be used in different environments. The second category deals with binary compatibility, which relates to a compiled (binary) program's ability to be executed in different environments.

Whilst there exists various techniques for providing source level compatibility, those techniques have significant shortcomings. For example, object versioning used with the GNU C library (glibc) involves creating a new version of the glibc library whenever an object (routine) in the library is updated such that the updated object is incompatible with early versions of the object. A new version of the glibc library creating using object versioning is such that it contains sources (code) for all versions of objects contained in the library. As a result, the glibc library can become bulky because it contains all versions of the objects.

Another problem closely associated with object versioning in glibc is that dynamic linkers based on object versioning tend to fail the application linking process if the available glibc library does not contain the specific version of an object that the linker requires.

A further example of an existing technique used to provide source level compatibility is function level versioning in HP-UX libraries. Function level versioning is similar to objecting versioning in the glibc library in that it involves creating a new library that contains all versions of a particular object. As mentioned previously, creating a new library that contains all versions of an object has the potential to produce bulky libraries.

SUMMARY OF THE INVENTION

In an embodiment of a method of facilitating a development of a computer program, the embodiment includes the step of determining whether there exists a first version of a routine that is to be incorporated into the computer program. Upon determining that the first version of the routine does not exist, the embodiment of the method proceeds to perform the step of locating a second version of the routine as a substitute for the first version to thereby facilitate the development.

The present invention will be more fully understood from the following description of a specific embodiment. The description is provided with reference to the accompanying figs.

DETAILED DESCRIPTION

Figure 1:
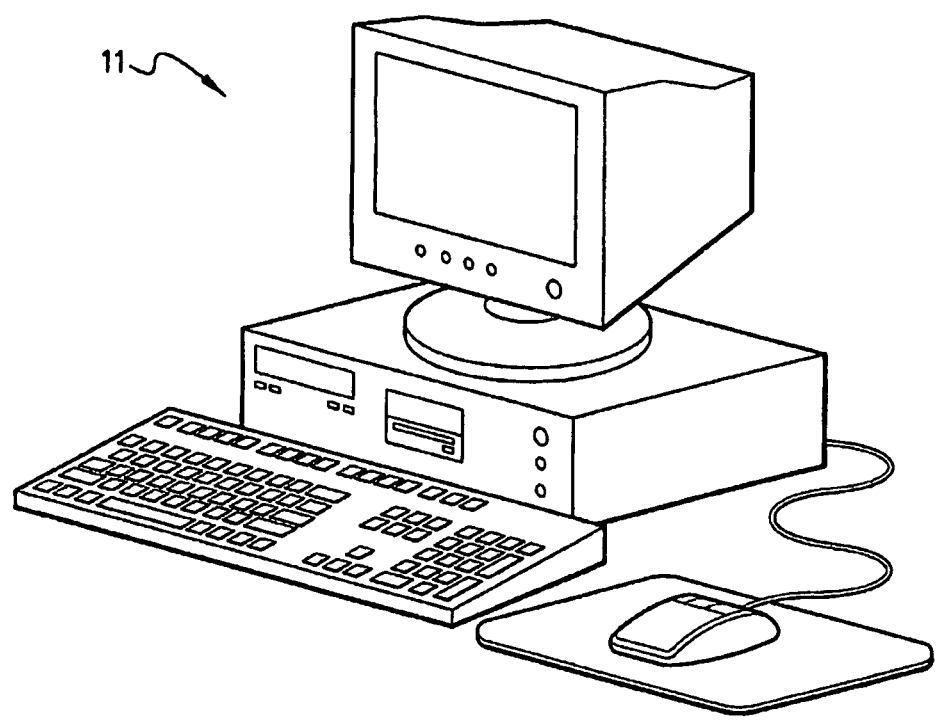
FIG. 1 illustrates a personal computer embodying the present invention.

FIG. 1. shows an embodiment of the present invention in the form of a personal computer 11. The personal computer is made up of numerous components that cooperate with each other. The components include: a power supply; motherboard; random access memory; a video card; a monitor; keyboard; and a hard disk loaded with the Linux operating system and a software development application. In alternative embodiments of the present invention, the hard disk of the personal computer 11 is loaded with other operating systems such as, for example, Microsoft XP, SunOS and MacOS.

The software development application can be executed by a software developer to essentially perform two tasks that facilitate the development of a computer program. The first of the tasks relates to creating a software library that includes routines that can be used to develop a computer program. The second of the tasks relates to locating a library routine that is to be incorporated into a computer program.

In relation to the first task of creating the software library, the software development application can be invoked by typing at a command line prompt: cc -c file_name, where cc is the file name of the software development application, -c is an option that informs the software development application to create a linkable object file (that is, to create the software library); and file_name is the file name of the source file that is to be used to create the linkable object file.

Figure 2:
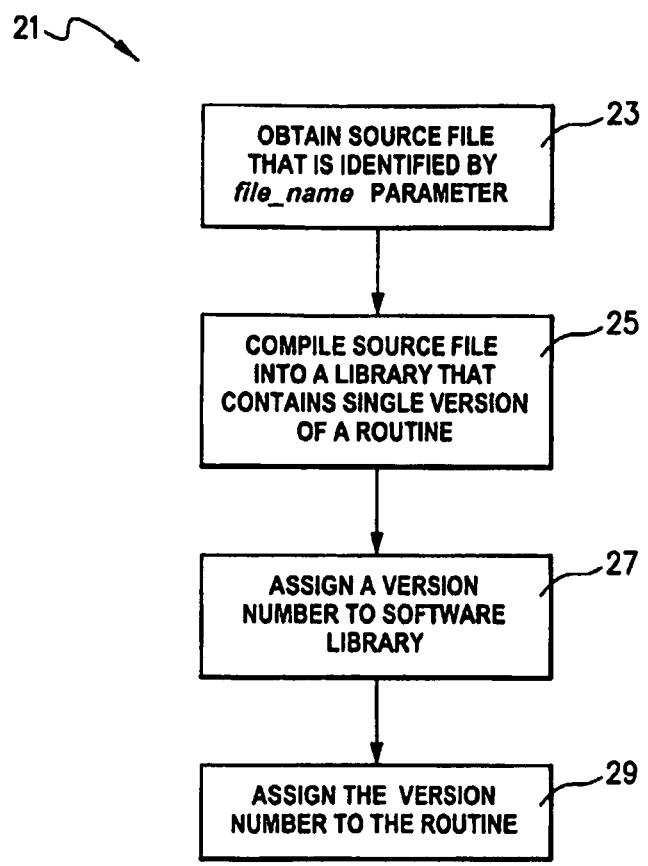
FIG. 2 is a flow chart of various steps performed by the personal computer shown in FIG. 1.

Once the software development application has been invoked as specified in the preceding paragraph, the personal computer 11 executes the various instructions included in the software development application. Execution of the instructions causes the personal computer 11 to carry out the steps shown in the flow chart 21 of FIG. 2. With reference to FIG. 2, the first step 23 that the software development application performs is to obtain the source file that is identified by the file_name parameter. The source file contains at least one routine that can be incorporated into a computer program. As persons skilled in the art will readily appreciate, a software developer can create the source file using an application such as a text editor or perhaps by using a more advanced application such a software development tool. The source file is typically written in a high level language such as C or C++ so that it can be easily interpreted by software developers.

Subsequent to carrying out the first step 23, the software development application proceeds to carry out the second step 25 of compiling the source file (that was obtained during the first step 23) to create the software library, which is in the form of linkable object code. The second step 25 of compiling the source file is such that the software library contains only a single version of any of the routines in the source file. The second step 25 of compiling the source code is such that it is capable of identifying the different versions of the routine in the source file, and placing the latest version into the library created during the compilation step 25. Earlier versions of the routine reside in previous versions of the software library. A consequence of the second step 25 is that potentially there will be multiple versions of the software library, each of which contains a single version of the routine. An advantage of this is that unlike existing techniques for providing source level compatibility (for example, object versioning in glibc), the software library created by the second step 25 does not contain multiple version of a routine and therefore the size of the library is minimised in comparison to existing source level compatibility techniques. Whilst a software library created by the second step 25 contains a single version of a routine, this does not preclude the library from containing multiple routines, each of which performs a different function. For example, a particular library may have functions abc( ) and def( ), but the library will only contain a single version of abc( ) and def( ).

To ensure that each version of a software library that the previous step 25 creates, the software development application carries out the third step 27 of assigning the software library a version number. In particular, the version number is appended to a file name of the library. For example, if the file name of the library is xyz.lib the third step 27 is such that the library would have the file name xyz.lib.10 where the library is the tenth version. There would also be other versions of the library that have the file names xyz.lib.1, xyz.lib.2, xyz.lib.3 . . . xyz.lib.9.

In addition to the step 27 of assigning the software library the version number, the software development application also includes the fourth step 29 of assigning the version number to the routine in the software library. The version number assigned to the routine corresponds to the version number assigned to the library during the third step 27. For instance, the routines in version 10 of a library (for example, xyz.lib.10) would be assigned the version number 10. The forth step 29 is such that it assigns the version number to the routine by assigning the version number to an entry in the software library's export table. The entry to which the version number is assigned is the entry that represents the routine. As persons skilled in the art will readily appreciate, the export table is essentially information contained in the library that enables a compiler to determine details of the various routines that are in the library.

Once the software library has been created it can then be used by a software developer to develop a computer program (application). As persons skilled in the art will readily appreciate the process of developing a computer program initially involves developing a source code file. The source code file can be developed by using a text editor or a more advanced software development tool. The source code file is usually written in a high level language such as C or C++. To create a binary (executable) version of the source file the software development application can be invoked to compile the source file, which includes linking the source code to the software library in the event that the source file uses one or more of the routines contained in the library.

To compile the source code file the software development application can be invoked by typing at a command line prompt: cc, routine_name1:vers_num1 routine_name2:vers_num2 file_name -o output_name-llib_name, where routine_name1:vers_num1 is an optional parameter that identifies the name (routine_name1) of a first routine in the software library and the version number (vers_num2) of the first routine, routine_name2:vers_num2 is a further optional parameter that identifies the name (routine_name2) of a second routine in the software library and the version number (vers_num2) of the second routine, file_name is the file name of the source code file to be compiled, -o is the name of the binary (compiled) version of the source code file, and -llib_name is the file name of the software library. It is noted that whilst the previous example of the command line contains two optional parameters that are used to identify routines in a library (routine_name1:vers_num1 and routine_name2:vers_num2), it will be readily appreciated that the command line is not restricted two parameters. For example, the command line might contain the names and version numbers of five routines in the software library. A specific example of how the software development application might be invoked is as follows: cc, abc:4 main. c -o main -lxyz, which effectively causes the software development application to compile the main.c source file into the binary file main and to resolve routine abc from version 4 of library xyz.

Figure 3:
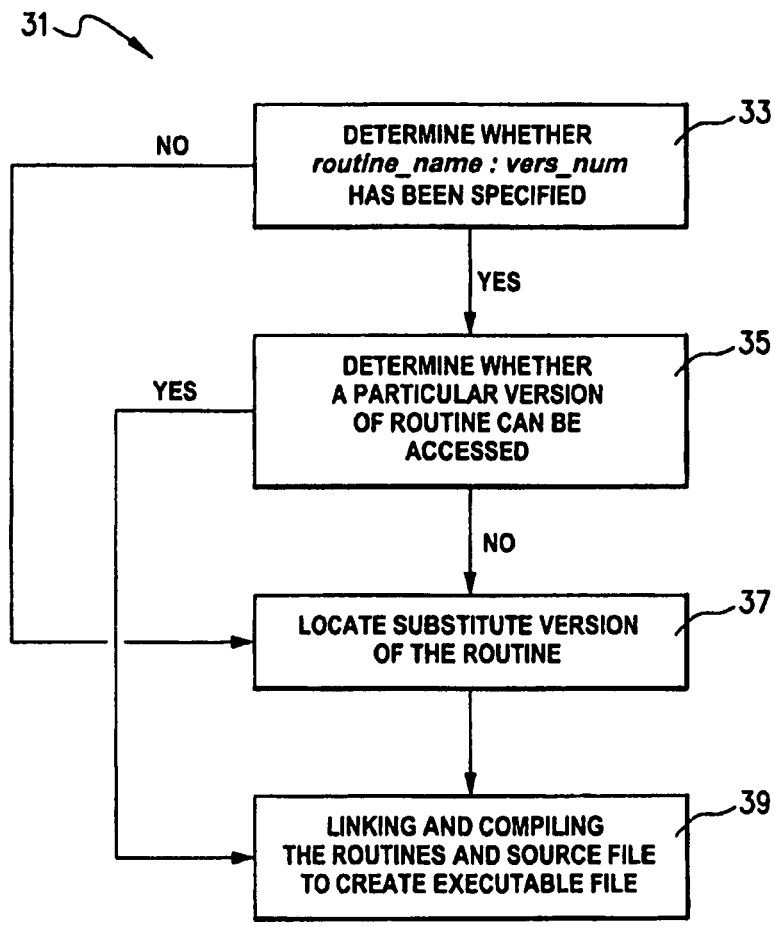
FIG. 3 is a flow chart of various steps performed by the personal computer shown in FIG. 1.

Once the software development application has been invoked as specified in the previous paragraph, the personal computer 11 executes various instructions included in the software development application. Execution of these instructions causes the personal computer 11 to carry out the steps shown in the flow chart 31 of FIG. 3. With reference to FIG. 3, the first step 33 that the software development application performs is to determine whether the routine_name: vers_num parameters have been specified. If the routine_name:vers_num parameters have not been specified, the software development application proceeds to the third step 37 (which is discussed in detail in subsequent paragraphs of this specification) to obtain the latest copy of library routines required to compile the computer program into an executable file. If, on the other hand, the routine_name:vers_num parameters have been specified, the software development application proceeds to carry out the second step 35 of determining whether a particular version (vers_num) of the routine (routine_name) can be accessed.

To carry out the second step 35 the software development application attempts to locate a software library on the personal computer 11 that contains the particular version of the routine. More specifically, the second step 35 involves searching for a copy of the library identified in the -llib_name parameter that has been assigned the same version number as the routine, the latter of which is identified by the vers_num parameter. To determine whether the copy of the software library is accessible, the software development application checks whether the routine version number (vers_num) is contained in the file name of the software library. For example, if the vers_num parameter is "4" and the -l parameter is "xyz", then the second step 35 effectively involves determining whether library xyz.lib.4 exists. If it is determined that the copy of the software library is accessible, the software development application precedes to carry out the final step 39, which is discussed in detail in subsequent paragraphs of this specification.

If as a result of carrying out the second step 35 the software development application is unable to locate a copy of the library (specified by the -l parameter) that contains the required version of the routine (vers_num), the software development application proceeds to carry out the third step 37 of locating a substitute version of the routine. An advantage of locating the substitute version is that unlike existing techniques for providing source level compatibility (such as that used with glibc), the software development application will not fail the linking process if it is unable to find the required version of a routine. The software development application will use the substitute version of the routine instead of the required version. It is noted, however, that use of the substitute version of the routine may cause the compiled computer program to perform in an unexpected manner.

Figure 4:
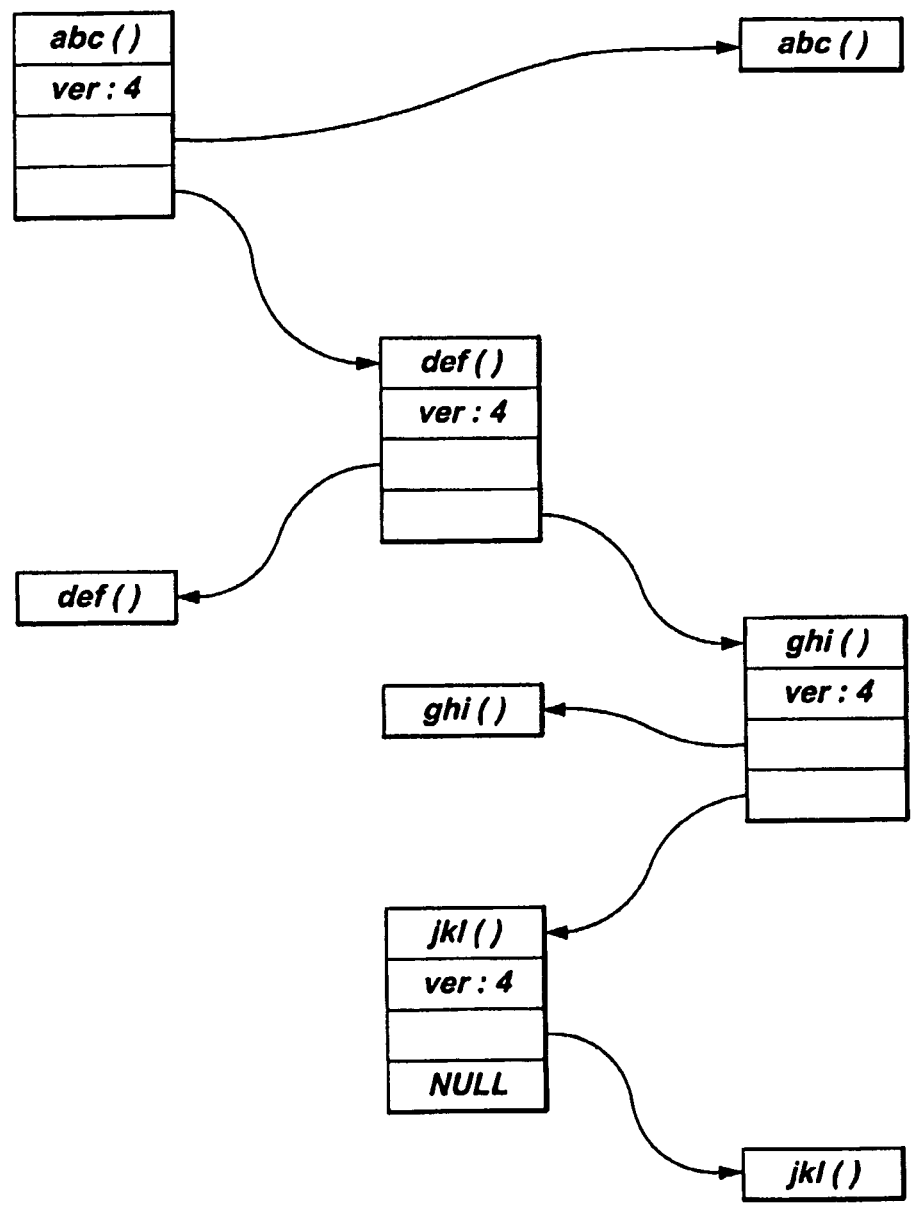
FIG. 4 illustrates a data structure used by the personal computer of FIG. 1.

To locate the substitute version of the routine, the third step 37 involves locating the latest version of the library identified by the -1 parameter. This is achieved by looking for a copy of the library that has the highest version number in its file name. This assumes that version numbers are assigned in ascending order, which results in the library with the highest version number being the latest version of the library. Once the latest version of the library has been located, the third step 37 involves processing a data structure that is stored in memory and which is associated with the latest version of the library. The data structure is processed to obtain a memory address from which the routine can be retrieved. The data structure is in the form of a linked list, which provides an advantage of being able to retrieve a routine quicker than using an export table of the library. The linked list is made up of nodes, each of which points to a routine in the library. Each node also contains the name of the associated routine and the routine's version number. FIG. 4 provides a representation of the linked list.

On completing the third step 37, the software development application proceeds to carry out the final step 39 of linking the routines obtained in the preceding steps and compiling the routines with the source code file to create a binary version thereof that can be executed on a computer system.

What is claimed is:

1. A method of compiling a computer program comprising:
    determining, with a software development program of a computer, whether there exists in memory coupled to the computer a software library, that has a single version of a routine assigned a version number that can be incorporated into the computer program, comprising a first version of a routine, represented by an entry including the version number in an export table included in the software library, that is to be incorporated into the computer program;
    upon determining that the first version of the routine does not exist, locating with the software development program a second version of the routine as a substitute for the first version; and
    linking the second version of the routine to the computer program.

2. The method as claimed in claim 1, wherein the step of attempting to locate the software library comprises the step of checking a version number that has been assigned to the software library.

3. The method as claimed in claim 2, wherein the step of checking the version number comprises the step of checking whether a file name of the software library comprises the version number.

4. The method as claimed in claim 1, wherein the step of locating the second version of the routine comprises the step of obtaining an address of the second version from a data structure that is stored in memory and which is associated with an alternative software library that comprises the second version.

5. The method as claimed in claim 4, wherein the data structure comprises a linked list that has a node that identifies a name of the second version and a version number assigned thereto.

6. The method as claimed in claim 4, wherein the alternative software library does not contain any other version of the routine.

7. A method of compiling a software library comprising:
    compiling the software library stored in memory that has a single version of a routine that can be incorporated into a computer program;
    assigning a version number to the routine, the version number indicating version of a named routine;
    incorporating the version number into an entry in an export table that is included in the library, the entry representing the name of the routine;
    determine whether there exists a first version of a routine that is to be incorporated into the computer program;
    upon a determining that the first version of the routine does not exist, locate a second version of the routine as a substitute for the first version; and
    link the second version of the routine to the computer program.

8. The method as claimed in claim 7, further comprising the step of assigning the software library a version number.

9. The method as claimed in claim 8, wherein the step of assigning the software library the version number comprises the step of incorporating the version number into a file name of the software library.

10. A non-transitory computer readable medium containing instructions thereon, which if executed by the computer cause the computer to:
    compile a software library that has a single version of the routine that can be incorporated into a computer program;
    assign a version number to the routine, the version number indicating version of a named routine;
    incorporate the version number into an entry in an export table that is included in the library, the entry representing the name of the routine;
    determine whether there exists a first version of a routine that is to be incorporated into the computer program;
    upon determining that the first version of the routine does not exist, locate a second version of the routine as a substitute for the first version; and
    link the second version of the routine to the computer program.

* * * * *